United States Patent [19]
Grant

[11] Patent Number: 4,602,698
[45] Date of Patent: Jul. 29, 1986

[54] HUNTING CHAIR

[76] Inventor: Walter R. Grant, Rte. 7, Box 160, Sulphur, La. 70663

[21] Appl. No.: 733,204

[22] Filed: May 13, 1985

[51] Int. Cl.[4] .................... A01M 31/02; A45F 3/26
[52] U.S. Cl. .................................. 182/142; 182/187
[58] Field of Search ............... 182/142, 235, 240, 187

[56] References Cited

U.S. PATENT DOCUMENTS

| | | |
|---|---|---|
| 380,546 | 4/1888 | Bradds .................................. 182/142 |
| 636,689 | 11/1899 | Nichols et al. ...................... 182/142 |
| 2,918,136 | 12/1959 | Faugier ................................ 182/142 |
| 3,568,797 | 3/1971 | Hardy .................................. 182/142 |
| 3,630,315 | 12/1971 | Meyer .................................. 182/142 |
| 3,731,762 | 5/1973 | Sirls .................................... 182/142 |
| 3,957,135 | 5/1976 | Lane .................................... 182/142 |
| 4,347,913 | 9/1982 | Cromer ................................ 182/142 |
| 4,347,914 | 9/1982 | Gary .................................... 182/142 |

FOREIGN PATENT DOCUMENTS

| | | |
|---|---|---|
| 1341538 | 9/1963 | France ................................. 182/142 |
| 1074649 | 7/1967 | United Kingdom ................. 182/142 |

Primary Examiner—Reinaldo P. Machado
Attorney, Agent, or Firm—Keaty & Keaty

[57] ABSTRACT

A hunting chair for elevating hunters and animals into trees is shown. The chair comprises an upright, hollow frame carrying a bracket below it. A reel is rotatably mounted in the bracket, and a cable is attached to the reel, extends through the hollow frame, and exits through an open top. Foot pedals are attached to the reel for rotating the reel and winding the cable around it to elevate the chair into a tree. Brackets brace the chair against the tree being climbed and a pair of brakes on the reel assure that the chair will not fall uncontrollably.

10 Claims, 2 Drawing Figures

HUNTING CHAIR

BACKGROUND OF THE INVENTION

1. Field of the Invention

This invention concerns devices for elevating people into fixed structures such as trees. More particularly, the invention is a hunting chair for elevating hunters and animals into trees.

2. General Discussion of the Background

Hunters find it advantageous to seek and shoot their prey from an elevated position. Stationary stands are often provided for this purpose so that the hunter will have greater visibility. Shooting at animals from an elevated vantage point also causes a bullet to strike the ground before it travels very far, thereby helping eliminate danger to any other hunters in the vicinity.

A serious disadvantage with stationary elevated platforms is that they lack mobility. A number of previous devices have therefore been developed to elevate a hunter at any desired location. U.S. Pat. Nos. 2,918,316, 3,568,797, 3,731,762, 3,957,135, 4,347,913 and 4,347,914 have suggested the use of seats which are attached to an overhanging structure by a cable. The cable is reeled in by an overhead reel to pull the chair up along the cable and into an elevated position. All of these structures, however, suffer from the common defect that they require overhead manipulation of a reel. The hunter must lift his own weight using the muscles of his arms, which are often much weaker than the larger muscles of the leg.

Another problem with the prior art elevated hunting chairs is that they often swing freely in mid air. This lack of stability can be a very serious problem when a hunter is aiming his gun. Environmental conditions such as wind can move the free swinging chair and cause the hunter to miss his target. Recoil from a fired gun can also cause the chair to swing violently.

Hunters also find it desirable to elevate dead animals above the ground to help drain the blood out of them. This is generally done by attaching a rope to the animal, throwing the free end of the rope over a tree limb, and pulling the free end to elevate the animal. No prior art devices serve the dual purpose of elevating a hunter into a tree and likewise elevating a dead animal.

It is accordingly an object of the present invention to provide a hunting chair which enables a hunter to elevate himself into a stationary object such as a tree by using leg muscles instead of arm muscles.

Another object of the invention is to provide a hunting chair which maintains stability when elevated and does not move in response to environmental conditions or recoil of a gun.

Yet another object of the invention is to provide an elevating hunting chair that will also assist in elevating dead animals.

SUMMARY OF THE INVENTION

The aforementioned objects are achieved by providing a hunting chair having a frame comprised of a hollow, upright member with a bracket at the bottom. A seat is fixed to the upright member and a pair of handlebars are secured to that member above the seat. A reel is rotatably mounted within the bracket of the frame below the seat, and a foot pedal is attached to each end of the reel.

Ratchets are circumferentially disposed around a first end of the reel, and a braking member is normally spring biased into braking engagement with the ratchets to prevent rotation of the reel. A first hand brake is mounted on the handlebar, and a first brake cable is attached to the hand brake which pulls the braking member out of braking enagement with the ratchets when the first handlebar is compressed. A brake drum is also disposed around the reel, and can be activated by compression of a second handle brake which pulls a second brake cable to move the brake drum into selectively braking relationship with the reel.

In preferred embodiments, a foot rest is secured to the frame below the seat and projects outwardly from the frame in a direction away from a tree being climbed. A Y-shaped spacer projects outwardly from the frame from a position adjacent the handlebars towards the tree being climbed to help hold the frame in spaced relationship to the tree and stabilize the chair. A bottom spacer projects outwardly from the bracket which carries the reel. The bottom spacer is provided with an arcuate member that fits in bracing relationship around the trunk of a tree being climbed.

An elevating line is attached at a first end to the reel, and then it travels through the hollow frame to a point above the handlebars whence it exits the frame. The cable is thrown over a tree limb and tied to a tree adjacent the base of the tree trunk.

DETAILED DESCRIPTION OF THE PREFERRED EMBODIMENT

The following detailed description of the preferred embodiment is being made in accordance with requirements of law which specify that a detailed description of the best mode of the invention be disclosed. This disclosure is not intended to limit the scope of the claims which appear after this detailed description.

Figure 1:
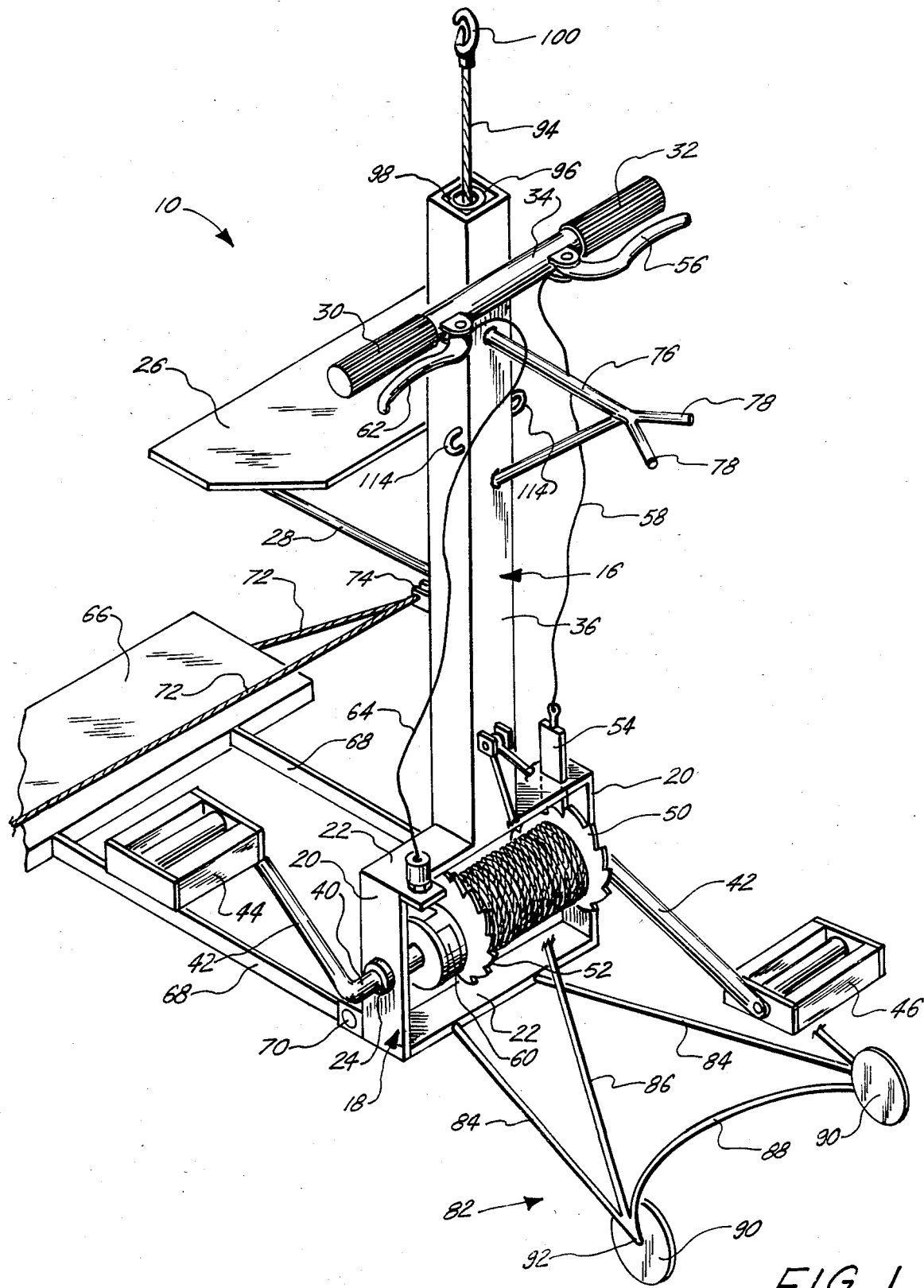
FIG. 1 is a perspective view of a hunting chair in accordance with the present invention, a portion of the foot rest being broken away.
Figure 2:
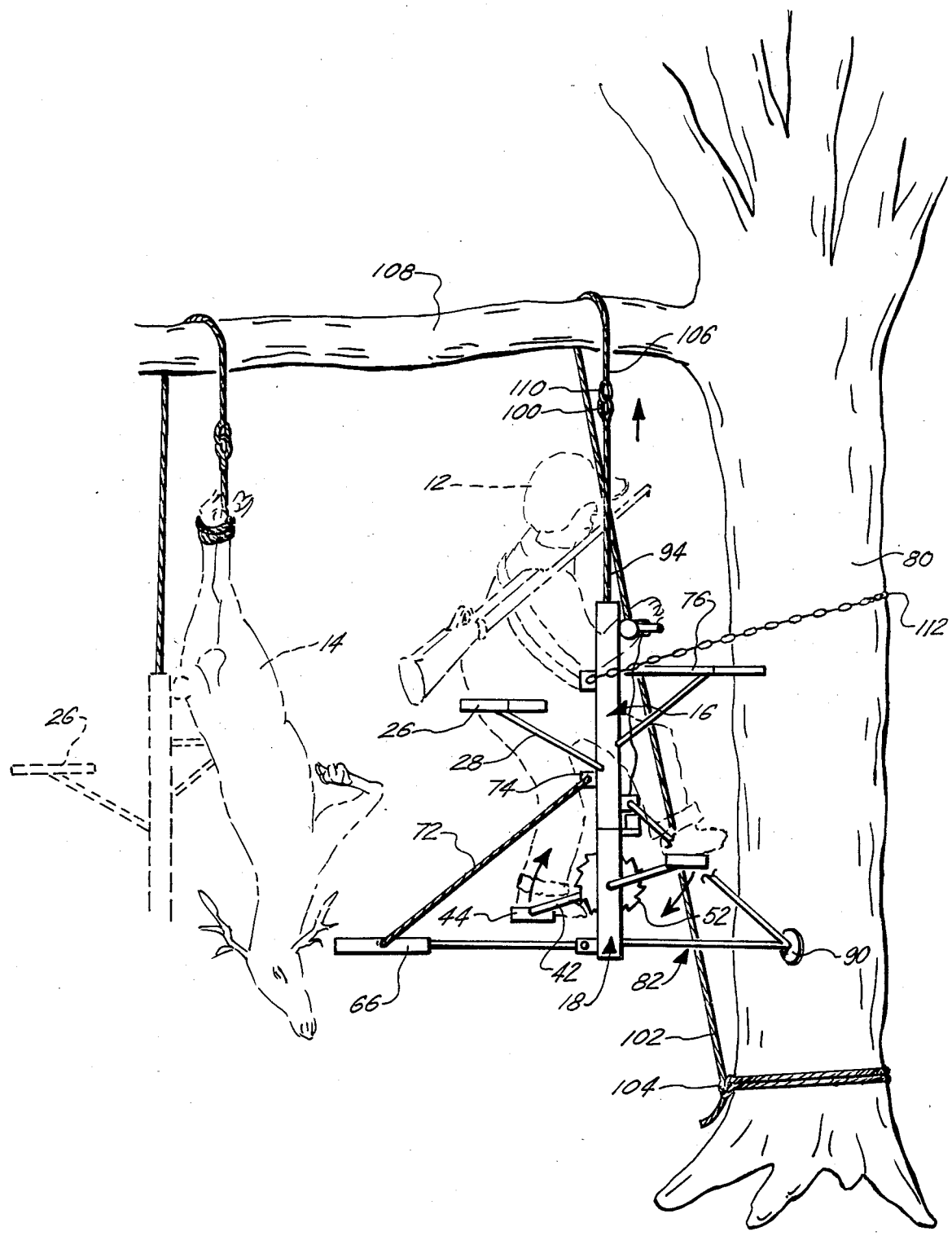
FIG. 2 is a view of the hunting chair is operation. The chair is shown elevating the hunter (in phantom) up a tree. A deer is also shown in phantom at the left side of the drawing, the deer having been elevated by the same or a similar hunting chair.

A hunting chair 10 for elevating hunters 12 and animals 14 into trees is shown in FIGS. 1 and 2. The chair comprises a frame having a hollow, elongated upright portion 16 with a bracket 18 at the bottom of portion 16. Bracket 18 is a substantially rectangular member having a pair of upright components 20 and upright components 22. Each of the horizontal components 20 is provided with an opening surrounded by a collar 24 for a purpose to be described below.

A flat seat 26 is fixed to upright portion 16 by means of a pair of support arms 28 which are welded at one end to the bottom of seat 26 and at the other end to portion 16. Seat 26 is attached to portion 16 so that it is held at about the middle of portion 16. The attachment between seat 26 and portion 16 is pivotal so that seat 26 can fold up against portion 16 of the frame. The pivotal attachments permit rotation of the seat towards the frame, while stops prevent downward rotation past the horizontal position shown in FIG. 1.

A pair of handlebars 30, 32 are secured to upright portion 16 above seat 26. Handlebars, 30, 32 are carried by a tube 34 that is welded to a front face 36 of portion 16. A reel 38 is rotatably mounted within bracket 18 at a level below seat 26. Reel 38 is rotatably carried within bracket 18 by an axle 40 which projects through the opposing openings in upright components 20 that are surrounded by collars 24. Axle 40 then bends into a pedal portion 42, and foot pedals 44, 46 are rotatably secured to the ends of portions 42 with a pivotal attachment 48.

A plurality of ratchets 50 are circumferentially disposed around a first side of the reel and enlarge the diameter of reel 38. A second, enlarged diameter portion also defines a plurality of ratchets 52 adjacent a second end of reel 38. A braking member 54 is placed through an opening in horizontal component 22 and is biased, by the effects of gravity or a spring, into normally braking enagement with ratchets 50 to prevent counterclockwise rotation of reel 38. A first hand brake 56 is mounted on tube 34 adjacent handlebar 32. A first brake cable 58 is attached between handlebar 56 and braking member 54 so that compression of first hand brake 56 pulls brake cable 58 and moves braking member 54 out of braking engagement with ratchets 50 to permit free rotation of reel 38. Cable 58 is of a conventional type found in bicycles having a plastic sheath around an inner wire, the inner wire being pulled by depression of pivotally mounted hand brake 56 towards handlebar 32. As the internal wire moves, it exerts an upward force on braking member 54.

A brake drum 60 is disposed around reel 38 between ratchets 52 and a second end of reel 38. A second hand brake 62 is pivotally mounted on tube 34 adjacent handlebar 30, and a second brake cable 64 is provided between second hand brake 62 and brake drum 60. Compression of hand brake 62 causes compression of brake drum 60 about an exposed portion of reel 38 in a manner well known in the art to thereby move the brake drum into selectively braking relationship with reel 38.

A foot rest 66 is secured to bracket 18 in substantially parallel relationship to the seat, foot rest 66 projecting below seat 26 farther from the frame than seat 26. Foot rest 66 is held in spaced relationship to bracket 18 by a pair of opposing, parallel arms 68 which are pivotally secured to bracket 18 at pivots 70. These pivots permit foot rest 66 to be moved upwardly about an axis through the pivots to help conserve space when chair 10 is being transported. A stop is provided in pivot 70, however, so that foot rest 66 can move no lower than the position in which it is shown in the drawings. Cables 72 are secured to a flange 74 that is welded to portion 16. Cables 72 help maintain foot rest 64 in a horizontal position when a hunter's feet are resting on it.

A Y-shaped spacer 76 projects outwardly from front face 36 of portion 16 from a position adjacent tube 34 that forms handlebars 30, 32. The tynes 78 of spacer 76 help maintain chair 10 in a stable, spaced relationship to tree 80 which is being climbed.

To further enhance stability of chair 10, a bottom spacer 82 is also provided which projects outwardly from bracket 18. Bottom spacer 82 is comprised of a pair of parallel arms 84 which are welded to the bottom of bracket 18, downwardly depending arms 86 which are welded to portion 16 above bracket 18, and an arcuate member 88 configured to fit in bracing relationship around a portion of the trunk of a tree 80 being climbed. Bottom spacer 82 carries a pair of guiding disks 90 which are attached to common points 92 of arms 84, 86, 88. The distance between disks 90 is great enough that they loosely fit along the sides of tree 80 to help guide the chair as it moves up the tree.

An elevating line 94, in the nature of a cable, rope or the like, is attached at a first end to reel 38. Line 94 then moves through hollow portion 16 of the frame and exits through an open top 96. A guide ring 98 is disposed inside open top 96 to help guide line 94 and prevent it from being abraided by the edges of open top 96. A second end of line 94 is provided with a clasp ring 100 for a purpose to be described below.

In operation, a rope 102 has an end 106 provided with a clasp ring 110 similar to the ring 100 described above. The rings 100, 110 can be selectively interconnected and locked together. At that point, rope 102 can be thrown over a limb 108 at a desired height, and the rope then tied around the base of a tree 80 with a knot 104. A chain 112 is then wrapped around the trunk of tree 80 and attached to each side of portion 16 by locking it in a pair of loops 114. Chair 10 is then placed adjacent a tree with disks 90 straddling opposing sides of tree 80. Spacer 76 in cooperation with bottom spacer 82 maintains chair 10 in an upright orientation as it proceeds up the tree. Chain 112 helps prevent any free fall of the device.

When a hunter desires to elevate himself up the tree, handlebar 56 is compressed to move braking member 54 out of braking engagement with ratchets 50. The hunter then seats himself on seat 26 while facing the tree and rotates pedals 44, 46 clockwise in a bicycle-like fashion. Movement of the pedals rotates reel 38 and winds cable 94 about reel 38. As the cable winds about the reel, chair 10 is lifted upwardly.

Because of the shape of ratchets 50, it is not essential that member 54 be disengaged from ratchets 50 before clockwise pedaling begins. Member 54 will be moved up along the inclined top edge of ratchets 50 as reel 38 rotates clockwise. Member 54 can then fall back into braking engagement with ratchets 50 once the apex of each ratchet has been passed. Clockwise rotation of reel 38 is thereby permitted where counterclockwise rotation is prevented. The tree can be gradually climbed without fear of rapid fall back to the ground.

If braking member 54 is out of braking engagement with ratchets 50 and the hunter slips, loses his balance or otherwise loses control of chair 10, his hand will slip from handlebar 32 and spring biased braking member 54 will immediately fall into braking engagement with ratchets 50 to prevent unwinding of line 94 from reel 38. Hunter 12 is also able to positively stop rotation of reel 38 by compressing hand brake 62 to move brake drum 60 into braking engagement with reel 38.

Once chair 10 has been elevated to its desired postiion, hand brake 56 can be released and braking member 54 reengaged with ratchets 50. Hunter 12 can then turn around while still seated on seat 26 and rest his feet on foot rest 66. The hunter is now able to hunt on a stable, elevated platform that will not move in response to environmental conditions or recoil of a gun.

After an animal 14 has been killed, the hunter may desire to elevate it into the tree to drain its blood. Chair 10 can be placed on the ground for this purpose with rope 102 attached to line 94 and with line 94 unwound from reel 38. The rope 102 is placed over the limb 108 and free end 116 used to tie the rear legs of the animal. The hunter then sits on seat 26 facing the frame and pushes the pedals to rotate the reel in a clockwise direction to raise the animal 14. As line 94 is wound onto reel 38 the animal is elevated.

The chair can be easily transported by pivoting footrest 66 and seat 26 from their operational positions shown in FIG. 1 to a stored position adjacent portion 16 of the frame. When footrest 66 and seat 26 are in their stored positions, the frame has a substantially flat side which can face the body of a hunter carrying it, thereby facilitating transportation of the chair.

I claim:

1. A hunting chair for elevating hunters and animals into trees, comprising:
   a frame;
   a seat pivotally attached to the frame and operable between a first position in substantially perpendicular relationship to the frame and a second position in substantially parallel relationship to the frame;
   a handle bar attached transversely to the frame above the seat;
   a reel rotatably mounted to the frame below the seat;
   means for turning the reel with the feet of the hunter;
   an elevating line attached at a first end to the reel, the line having a second end for attachment to the tree, and
   a foot rest and observation platform pivotally attached to the frame below and in substantially parallel relationship to the seat when the seat is in its first position, the foot rest and observation platform projecting farther from the frame than the seat.

2. The chair of claim 1, wherein the foot rest and observation platform is pivotally operable between a first position in substantially perpendicular relationship to the frame and a second position is substantially parallel relationship to the frame.

3. The chair of claim 1 wherein the means for turning the reel comprises a first foot pedal attached to a first side of the reel and a second foot pedal attached to a second side of the reel.

4. The chair of claim 3, wherein ratchets are circumferentially disposed around the first side of the reel, and a braking member, normally compressed by a compression spring into braking engagement with the ratchets, prevents rotation of the reel in one direction, the braking member being provided with means for selectively moving the braking member out of braking engagement with the ratchets.

5. The chair of claim 4, wherein said means for selectively moving the braking member out of its braking engagement with the ratchets comprise a brake line attached at its first end to a hand brake mounted on the handlebar and attached at its second end to the braking member, so that compression of the hand brake pulls the brake line and disengages the braking member from the ratchets.

6. The chair of claim 4 further comprising a brake drum disposed in normally non-braking relationship around the reel, and means for moving the brake drum into selectively braking relationship with the reel.

7. The chair of claim 6 wherein the frame defines a passageway through which the elevating line passes from the reel to a top of the frame.

8. The chair of claim 7 further comprising spacing means projecting outwardly from the frame to hold the chair in spaced relationship to a tree being climbed.

9. The chair of claim 8 further comprising a foot rest projecting outwardly from the frame below the seat.

10. A hunting chair for elevating hunters and animals into trees, comprising:
    a frame comprised of a hollow, upright portion with a bracket at the bottom of the upright portion;
    a seat fixed to the upright portion;
    a handlebar secured to the upright portion above the seat;
    a reel rotatably mounted within the bracket of the frame below the seat;
    a first foot pedal attached to a first side of the reel and a second foot pedal attached to a second side of the reel;
    ratchets circumferentially disposed around a first side of the reel, and a braking member in normally braking engagement with the ratchets to prevent rotation of the reel in one direction;
    a first hand brake mounted on the handlebar, and a first brake cable from the first hand brake to the braking member, compression of the first hand brake pulling the first brake cable and moving the braking member out of braking engagement with the ratchets;
    a brake drum disposed around the reel;
    a second hand brake mounted on the handlebar, and a second brake cable from the second hand brake to the brake drum, compression of the second hand brake pulling the second brake cable and moving the brake drum into selectively braking relationship with the reel;
    a foot rest secured to the frame below and in substantially parallel relationship to the seat, the foot rest projecting farther from the frame than the seat;
    a Y-shaped spacer projecting outwardly from the frame adjacent the handlebars in a direction opposite to the direction the seat extends from the frame for holding the frame in spaced relationship to a tree being climbed;
    a bottom spacer projecting outwardly from the bracket, the bottom spacer having an arcuate member configured to fit in bracing relationship around a portion of the trunk of a tree being climbed, the bottom spacer also being provided with a pair of guiding disks which help guide the chair as it moves up the tree; and
    an elevating line attached at a first end to the reel, the line being placed through the hollow frame and exiting through an open top of the frame, the line having a second end for attachment to the tree.

* * * * *